(12) United States Patent
Morita et al.

(10) Patent No.: US 11,079,826 B2
(45) Date of Patent: Aug. 3, 2021

(54) CONTROL APPARATUS, CONTROL METHOD, AND PROGRAM

(71) Applicant: Yokogawa Electric Corporation, Tokyo (JP)

(72) Inventors: Yoshie Morita, Tokyo (JP); Kazushi Sakamoto, Tokyo (JP); Atsushi Terayama, Tokyo (JP); Itsuki Handa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 167 days.

(21) Appl. No.: 16/551,720

(22) Filed: Aug. 27, 2019

(65) Prior Publication Data
US 2019/0384371 A1    Dec. 19, 2019

Related U.S. Application Data

(63) Continuation of application No. PCT/JP2018/016679, filed on Apr. 24, 2018.

(30) Foreign Application Priority Data

Apr. 25, 2017    (JP) .............................. JP2017-086225

(51) Int. Cl.
| G06F 1/3206 | (2019.01) |
| G06F 1/3234 | (2019.01) |
| G06F 1/3287 | (2019.01) |
| G06F 9/4401 | (2018.01) |
| G05B 19/045 | (2006.01) |

(52) U.S. Cl.
CPC .......... *G06F 1/3206* (2013.01); *G05B 19/045* (2013.01); *G06F 1/3278* (2013.01); *G06F 1/3287* (2013.01); *G06F 9/4418* (2013.01)

(58) Field of Classification Search
None
See application file for complete search history.

(56) References Cited

U.S. PATENT DOCUMENTS

2017/0083036 A1    3/2017  Sueki

FOREIGN PATENT DOCUMENTS

GB    2508704 A    6/2014

OTHER PUBLICATIONS

Yasuhiko Yamashiro et al, "Hardware Features of the ProSafe-RS", Yokogawa Technical Reports, Oct. 30, 2005, No. 4(2005), vol. 49, pp. 155-158, Yokogawa Electric Corporation.
International Search Report and (ISA/237) Written Opinion of the International Search Authority for International Patent Application No. PCT/JP2018/016679, mailed by the European Patent Office dated Aug. 23, 2018.

*Primary Examiner* — Carlos R Ortiz Rodriguez

(57) ABSTRACT

A control apparatus characterized by including: a storage unit that stores operation management information; an application executing unit that transmits a signal for turning off the power source of a field instrument; a resetting unit that, based on the signal, instructs to suspend the power supply from the input/output modules; and an activating unit that instructs to resume the power supply from the input/output modules, based on an elapse of preset time during which the power supply from the input/output modules should be suspended.

9 Claims, 6 Drawing Sheets

| MODULE NO. | CONTROLLED STATE 41 | CONTROLLED STATE BEFORE RESETTING 42 |
|---|---|---|
| 1 | TRUE | TRUE |
| 2 | FALSE | FALSE |
| ... | ... | ... |
| 7 | FALSE | FALSE |
| 8 | TRUE | TRUE |

FIG. 4

CONTROL APPARATUS, CONTROL METHOD, AND PROGRAM

CROSS REFERENCE TO RELATED APPLICATIONS

This is a continuation application of International Application No. PCT/JP2018/016679, filed on Apr. 24, 2018, which claims priority to Japanese Patent Application No. 2017-086225, filed on Apr. 25, 2017, the contents of each of which are incorporated herein by reference.

TECHNICAL FIELD

The present invention relates to a control apparatus, and in particular relates to a control apparatus, control method and program to suppress switching of the controlled state (running/waiting) of redundant input/output modules in an F&G (Fire and Gas) system of a safety instrumented system.

RELATED ART

Conventionally, at plants that perform oil refining or petrochemistry processes, water treatment processes for water and sewage, or other processes, process control systems to control, for example, the state functions in industrial processes such as pressures, temperature or flow rates include control systems such as distributed control systems (DCSs) and safety systems such as safety instrumented systems (SISs) in order to perform high-level control while at the same time ensuring safety.

In a distributed control system like the ones mentioned above: field instruments like for example flowmeters and transmitters and a control apparatus to control the field instruments are connected via a network; measurement data obtained through measurement by the field instruments is collected by the control apparatus; and the control apparatus controls the field instruments according to the collected measurement data. Thereby, the system controls various types of state function.

In a safety instrumented system like the ones mentioned above, field instruments to sense gas, flame, heat, smoke and the like are provided, and alarms are issued according to sensing results of the field instruments. By stopping operation of the plant in the surely safe state according to the urgency of such alarms, the system attempts to prevent accidents that can result in injury or death and environmental pollutions before they actually happen and also to protect facilities at the plant.

For example, Non-Patent Document 1 discloses a configuration example of a control apparatus used in a safety instrumented system.

Patent Document 1 discloses a technique of performing ON/OFF control at a power source of a field instrument in a safety instrumented system in order to cancel an alarm issued from the field instrument.

Non-Patent Document
[Non-Patent Document 1] Yasuhiko Yamashiro, "Hardware Features of the ProSafe-RS", Yokogawa Technical Reports, Yokogawa Electric Corporation, Oct. 30, 2005, Vol. 49, No. 4 (2005) p. 155-158
Patent Document
[Patent Document 1] Japanese Patent Application Publication No. 2017-059115

SUMMARY

FIG. 1 shows a configuration example of a control apparatus 1 used in a conventional safety instrumented system. The control apparatus 1 is connected with a human interface station 5 and an engineering terminal 6 via a control network 7 such as Vnet/IP (registered trademark). In FIG. 1, the control apparatus 1 is constituted by: a safety control unit constituted by power source modules 141/142, processor modules 131/132, input/output modules 111-116 (hereinafter, referred to as I/O modules), communication bus modules 121/122 and a field instrument 4 connected via the I/O modules 111-116; a first safety node unit constituted by power source modules 231/232, I/O modules 211-218, communication bus modules 221/222 and a field instrument (not illustrated) connected via the I/O modules 211-218; and a second safety node unit constituted by power source modules 331/332, I/O modules 311-318, communication bus modules 321/322 and a field instrument (not illustrated) connected via the I/O modules 311-318. The respective modules among these power source modules 141/142, 231/232 and 331/332, processor modules 131/132, I/O modules 111-116, 211-218 and 311-318, and communication bus modules 121/122, 221/222 and 321/322 can have redundant configurations, with two modules forming a pair of modules, one module being in the control state (control side) and the other module being in the standby state (standby side).

The power source modules 141/142, 231/232 and 331/332 supply power to the processor modules 131/132, I/O modules 111-116, 211-218 and 311-318 and communication bus modules 121/122, 221/222 and 321/322 constituting the control apparatus 1.

The processor modules 131/132 are connected with the control network 7, acquire measurement values of the field instruments 4 via the I/O modules 111-116, 211-218 and 311-318 and perform arithmetic processing for calculating control parameters for controlling the plant.

The communication bus modules 121/122 are connected with the other communication bus modules 221, 222, 321 and 322 via communication buses, and expand the control apparatus 1 including the I/O modules 211-218, 311-318.

The I/O modules 111-116, 211-218 and 311-318 are connected with the field instruments 4, and convert signals input to or output from the field instruments 4 into a format on which arithmetic processing for calculating control parameters for controlling the plant can be performed at the processor modules 131/132. Furthermore, the signals obtained through the conversion are transmitted to the processor modules 131/132 for performing arithmetic processing for calculating control parameters for controlling the plant.

In addition, the I/O modules 111-116, 211-218 and 311-318 supply power at the field instruments 4 connected thereto in order to operate the field instruments 4. Here, if redundant I/O modules supply power to a field instrument 4, one module in the control state (control side) supplies power. At this time, the other module in the standby state (standby side) is waiting while being connected with the field instrument 4 so that it can supply power on behalf of the one module in the control state (control side) that supplies power for example if the one module becomes unable to supply power due to failure or the like.

If power is supplied via redundant I/O modules, power may be supplied from both a module in the control state (control side) and a module in the standby state (standby side).

Here, if measurement values exceeding predetermined thresholds are detected, the field instruments 4 connected to the I/O modules, 111-116, 211-218 and 311-318 issue alarms to that effect. Once measurement values exceed the thresholds, the field instruments 4 keep issuing alarms even if the measurement values fall below the thresholds. This is because an operator, maintenance worker or the like of the plant necessarily has to be informed that danger/abnormality at the plant was detected by the field instruments 4. It is necessary to turn off the power sources of the field instruments 4 temporarily, in order to cancel the alarm issuing state of the field instruments 4. Hereinafter, operation in which power supply to the field instruments 4 via the I/O modules 111-116, 211-218 and 311-318 is suspended and thereafter the power supply is resumed (that is, the power sources are turned off and thereafter turned on) in order to cancel the alarm issuing state at the field instruments 4 and bring them back to the normal state (the state where alarms are not issued) is called "resetting" operation.

If the field instruments 4 are to be reset, the control apparatus 1 controls power supply to the field instruments 4 via the I/O modules 111-116, 211-218 and 311-318 connected with the field instruments 4.

Upon receiving an instruction to reset the field instrument 4 from the control apparatus 1, the redundant I/O modules 111-112 cause transition of the I/O modules 111-112 from the controlled state to the uncontrolled state by means of a control means (not illustrated), and suspends power supply to the field instrument 4. Here, the uncontrolled state refers to the state where the redundant I/O modules 111-112 cannot be controlled by the control apparatus 1 (off-line state). On the other hand, the state where the control apparatus 1 can control the redundant I/O modules 111-112 to bring one of the modules into the control state (control side), and the other module into the standby state (standby side) is referred to as the controlled state (on-line state).

Upon an elapse of preset time, the I/O modules 111-112 resume power supply to the field instrument 4 following an instruction from the control apparatus 1 to restore the field instrument 4.

Here, if the redundant I/O modules 111-112 are to suspend and resume power supply to the field instrument 4, the control state (control side) and standby state (standby side) of the I/O modules 111-112 may switch. For example, if resetting operation is performed, the controlled state (running/waiting) of the I/O modules 111-112 is restored, and power is supplied to the field instrument 4 with the I/O module 111 which was in the standby state (standby side) before resetting being in the control state (control side) and the I/O module 112 which was in the control state (control side) before resetting being in the standby state (standby side).

That is, the control state (control side) or standby state (standby side) of the respective I/O modules 111-112 switch to the standby state (standby side) or the control state (control side), respectively before and after the resetting operation, and the field instrument 4 receives power-supply.

For example, taking the I/O modules of FIG. 1 as an example, it is assumed here that resetting operation is performed about the field instrument connected to the redundant I/O modules 111-112, with the I/O module 111 being operating in the standby state (standby side) and the I/O module 112 being operating in the control state (control side). Then, after resetting was performed, the field instrument 4 receives power-supply with the I/O module 111 being operating in the control state (control side) and the I/O module 112 being operating in the standby state (standby side). That is, following the resetting operation about the field instrument 4, the control state (control side) and standby state (standby side) of the I/O modules 111-112 switch.

If the control state (control side) or standby state (standby side) of the redundant I/O modules 111-112 switch to the standby state (standby side) or the control state (control side), respectively, this is recorded at the plant as failure or malfunction having been occurred to the I/O modules 111-112, and failure/malfunction of the I/O modules 111-112 is notified to an operator. However, the cause of the failure/malfunction of the I/O modules 111-112 recorded cannot be identified, whether it is based on resetting operation about the field instrument 4, it is failure/malfunction of the I/O modules 111-112, and so on.

Therefore, the operator cannot cope with failure/malfunction of the I/O modules 111-112 promptly. As a result of this, cause identifying work about failure/malfunction of the I/O modules 111-112 or replacement work for the I/O modules 111-112 is necessitated, and the work of the operator becomes complicated.

In view of this, an object of the present invention is to suppress switching of the redundant I/O modules 111-112 from the running state to the waiting state or from the waiting state to the running state following resetting operation about the field instrument 4.

In order to overcome such drawbacks, an aspect of the present invention provides a control apparatus. The control apparatus may communicate with a field instrument installed in a plant via a plurality of input/output modules. The control apparatus may cause one of two of the plurality of input/output modules to run and the other one to wait, to make the input/output modules redundant. The control apparatus may include a storage unit that stores operation management information. The control apparatus may include an application executing unit that transmits a signal for suspending power supply to the field instrument. The control apparatus may include a resetting unit that, based on the signal, transmits an instruction to suspend power supply from the input/output modules. Based on reception of the signal, the resetting unit may store or update a controlled state of the input/output modules stored in the operation management information.

The operation management information may include a state where the redundant input/output modules are running or waiting. The operation management information may include a state where the input/output modules are running or waiting at timing of transmission of the instruction to suspend the power supply.

The operation management information may include at least either: a state where the input/output modules are running or waiting at timing of transmission of the instruction to suspend the power supply; or a state where the input/output modules are running or waiting at timing when operation for suspending the power supply to the field instrument is performed by a human interface station connected with the control apparatus via a network.

Upon reception of the instruction to suspend the power supply, the redundant input/output modules may suspend power supply from a running input/output module among the input/output modules after an elapse of preset time.

The control apparatus may include an application executing unit that transmits a signal for resuming the power supply to the field instrument. The control apparatus may include a resetting unit that, based on the signal for resuming the power supply, transmits an instruction to resume the power supply from the input/output modules. The control apparatus may include an activating unit that transmits an instruction to resume the power supply from the input/output modules, based on an elapse of preset time during which the power supply from the input/output modules should be suspended.

Upon reception, from the activating unit, of the instruction to resume the power supply from the input/output modules, based on the operation management information, the redundant input/output modules may resume the power supply from an input/output module which has been running among the input/output modules.

The input/output modules may have a control means that switches a state of the input/output modules between a running state and a waiting state. Based on the state of the input/output modules being switched between the running state and the waiting state by the control means, in the operation management information, information that is stored on a memory provided to the input/output modules and indicates that the input/output modules are in the running state or the waiting state may be stored or updated.

In order to overcome such drawbacks, another aspect of the present invention provides a control method. The control method may be performed by a control apparatus which: is in a plant where a field instrument is installed; and has a storage unit that communicates with the field instrument via a plurality of input/output modules and stores operation management information. The control method may cause one of two of the plurality of input/output modules to run and the other one to wait, to make the input/output modules redundant. The control method may include transmitting a signal for suspending power supply to the field instrument. The control method may include transmitting, based on the signal, an instruction to suspend power supply from the input/output modules. The control method may include transmitting, based on an elapse of preset time during which the power supply from the input/output modules should be suspended, an instruction to resume the power supply from the input/output modules. The control method may include storing or updating, based on reception of the instruction to resume, a controlled state of the input/output modules stored in the operation management information.

In order to overcome such drawbacks, another aspect of the present invention provides a program. The control program may be executed by a computer of a control apparatus which: is in a plant where a field instrument is installed; and has a storage unit that communicates with the field instrument via a plurality of input/output modules and stores operation management information. The control program may cause one of two of the plurality of input/output modules to run and the other one to wait, to make the input/output modules redundant. The program may cause the computer to transmit a signal for suspending power supply to the field instrument. The program may cause the computer to transmit, based on the signal, an instruction to suspend power supply from the input/output modules. The program may cause the computer to instruct to resume the power supply from the input/output modules based on an elapse of preset time during which the power supply from the input/output modules should be suspended. The program may cause the computer to store or update, based on reception of the instruction to resume, a controlled state at the input/output modules in the operation management information.

The summary clause does not necessarily describe all necessary features of the embodiments of the present invention. The present invention may also be a sub-combination of the features described above.

BRIEF DESCRIPTION OF DRAWINGS

FIG. 4 is a diagram for explaining the basic configuration showing one example of conventional process control systems.

DESCRIPTION OF EXEMPLARY EMBODIMENTS

Hereinafter, (some) embodiment(s) of the present invention will be described. The embodiments do not limit the invention according to the claims, and all the combinations of the features described in the embodiments are not necessarily essential to means provided by aspects of the invention.

Configuration Example of Control Apparatus in Safety Instrumented System

Figure 1:
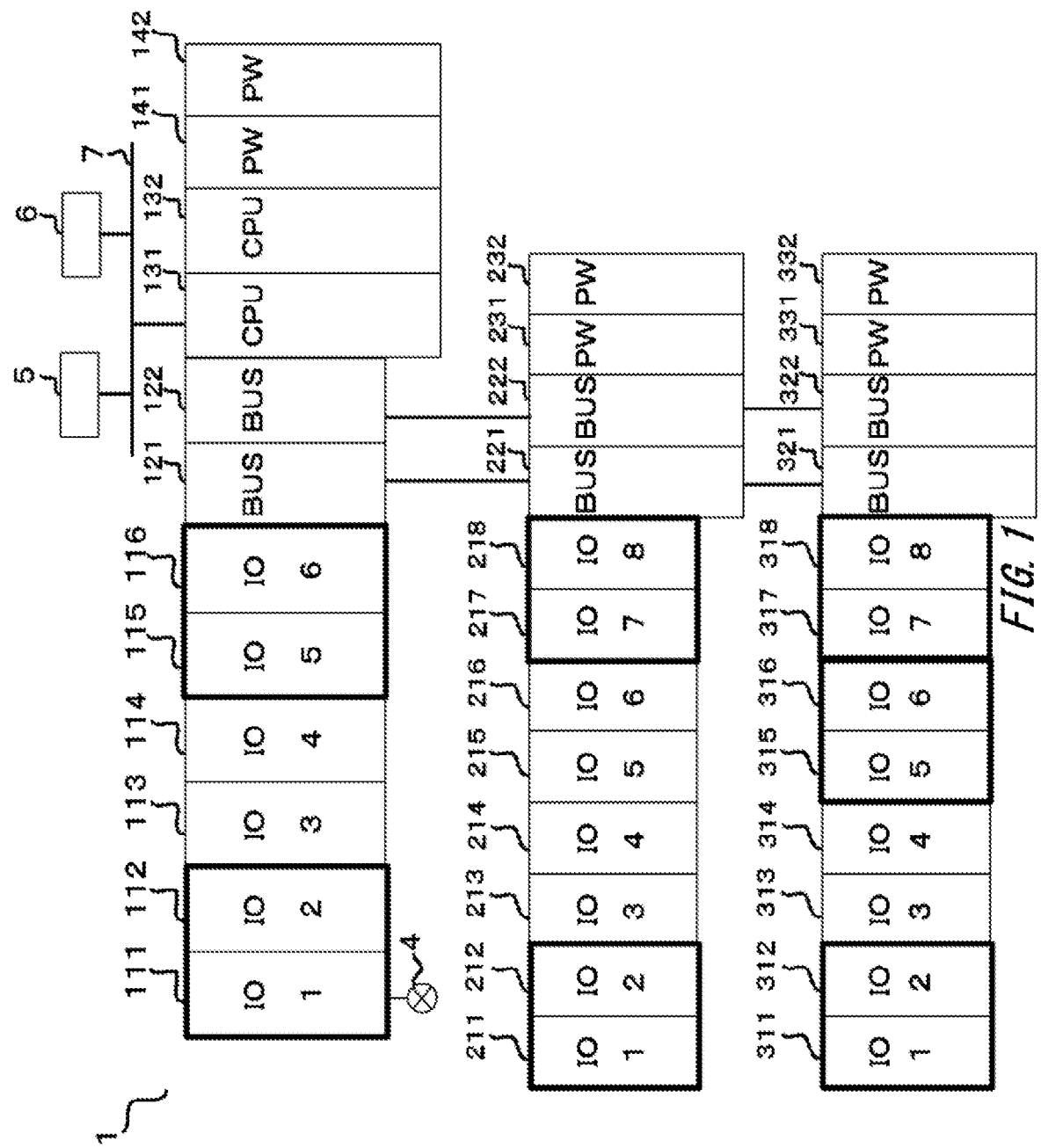
FIG. 1 is a configuration diagram showing a configuration example of a control apparatus in a conventional safety instrumented system.
Figure 2:
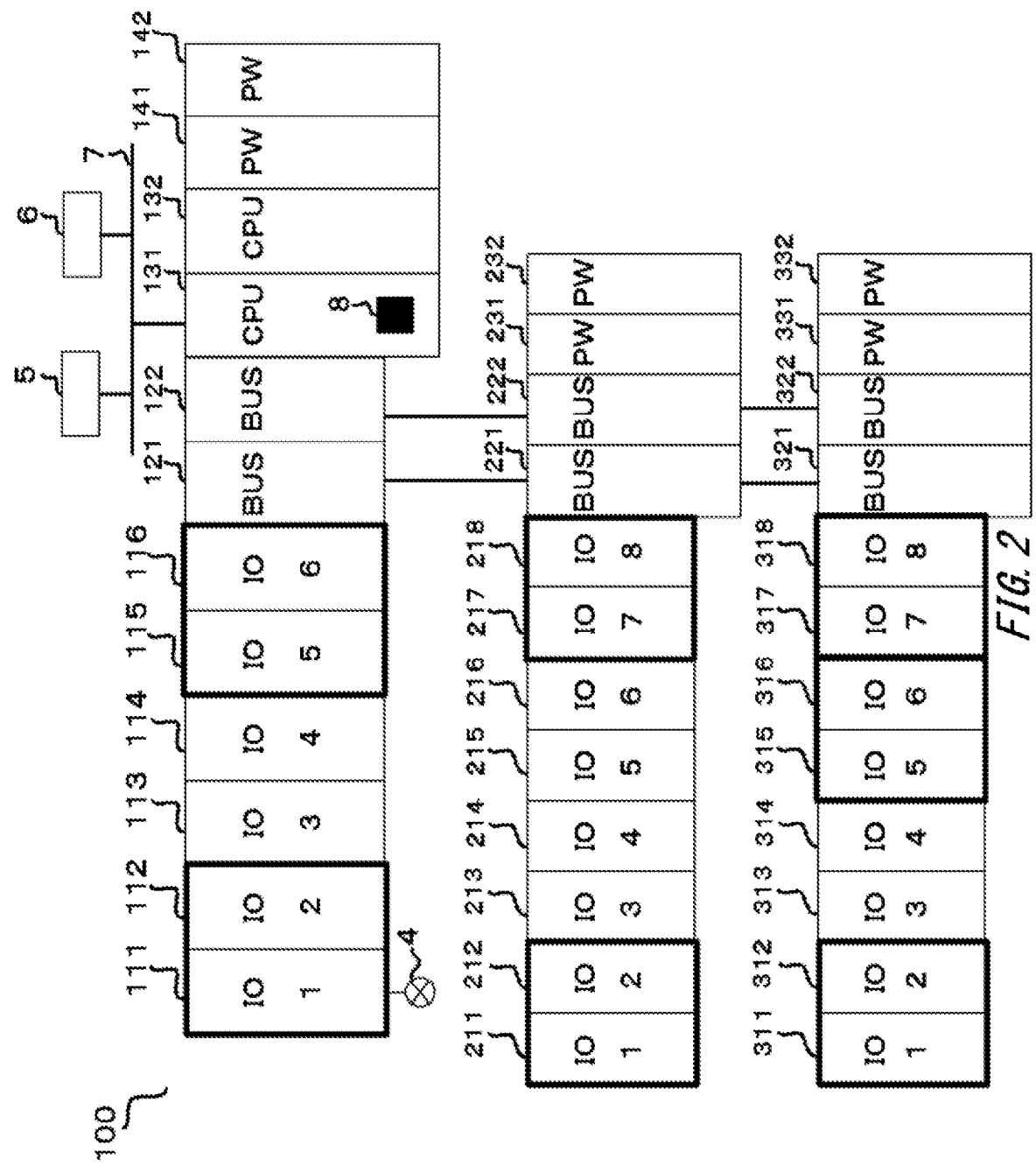
FIG. 2 is a configuration diagram showing a configuration example of a control apparatus in a safety instrumented system of the present invention.

Hereinafter, detailed explanation of a control apparatus in a safety instrumented system according to the present invention is given with reference to figures. FIG. 2 is a diagram for explaining a basic configuration of the present invention, and portions that are the same as the corresponding portions in FIG. 1 are given the same reference symbols.

In FIG. 2, a control apparatus 100 is constituted by: a safety control unit constituted by power source modules 141/142, processor modules 131/132, I/O modules 111-116, communication bus modules 121/122 and a field instrument 4 connected via the I/O modules 111-116; a first safety node unit constituted by power source modules 231/232, I/O modules 211-218, communication bus modules 221/222 and a field instrument (not illustrated) connected via the I/O modules 211-218; and a second safety node unit constituted by power source modules 331/332, I/O modules 311-318, communication bus modules 321/322 and a field instrument (not illustrated) connected via the I/O modules 311-318. The safety control unit and these safety node units are connected with a human interface station 5 and an engineering terminal 6 via a control network 7 such as Vnet/IP (registered trademark) as in FIG. 1 in which they are connected with the field instruments 4 via the communication bus modules 121/122, 221/222 and 321/322, I/O modules 111-116, 211-218, and 311-318 and the like. In addition, the respective modules among the power source modules 141/142, 231/232 and 331/332, processor modules 131/132, I/O modules 111-116, 211-218 and 311-318, and communication bus modules 121/122, 221/222 and 321/322 constituting the control apparatus 100 can have redundant configurations, with two modules forming a pair of modules, one module being in the control state (control side) and the other module being in the standby state (standby side).

The field instruments 4 are, for example, a sensor instrument such as a flowmeter or a temperature sensor, a valve instrument such as a flow rate control valve or an opening/closing valve, an actuator instrument such as fans or a motor or another instrument installed at a site of the plant.

The human interface station 5 is, for example, an apparatus to be operated by a plant operator and used for monitoring of processes. In addition, on the human interface station 5, for example, measuring instrument diagrams 501/502 that make it possible to perform operation of suspending or resuming power supply to the field instruments 4 may be displayed. The engineering terminal 6 is an apparatus for creating a program to be executed by the control apparatus 100.

In the present invention, it is realized at processor modules 131/132 to suppress switching between the control state (control side) and standby state (standby side) at the redundant I/O modules 111-112 that is attributable to execution of a series of resetting operation in which after operation of temporarily suspending power supply from the redundant I/O modules and thereafter resuming it, the field instrument 4 is brought from the alarm issuing state back to the normal state (the state where an alarm is not issued). In addition, although in the present example, a switching suppression function 8 about switching between the control state (control side) and standby state (standby side) of I/O modules at the processor module 131 in the control state (control side) which is one of redundant modules is described, a similar switching suppression function (not illustrated) about switching between the control state (control side) and standby state (standby side) of I/O modules is mounted also in the processor module 132 in the standby state (standby side) which is the other one of the redundant modules.

Figure 3:
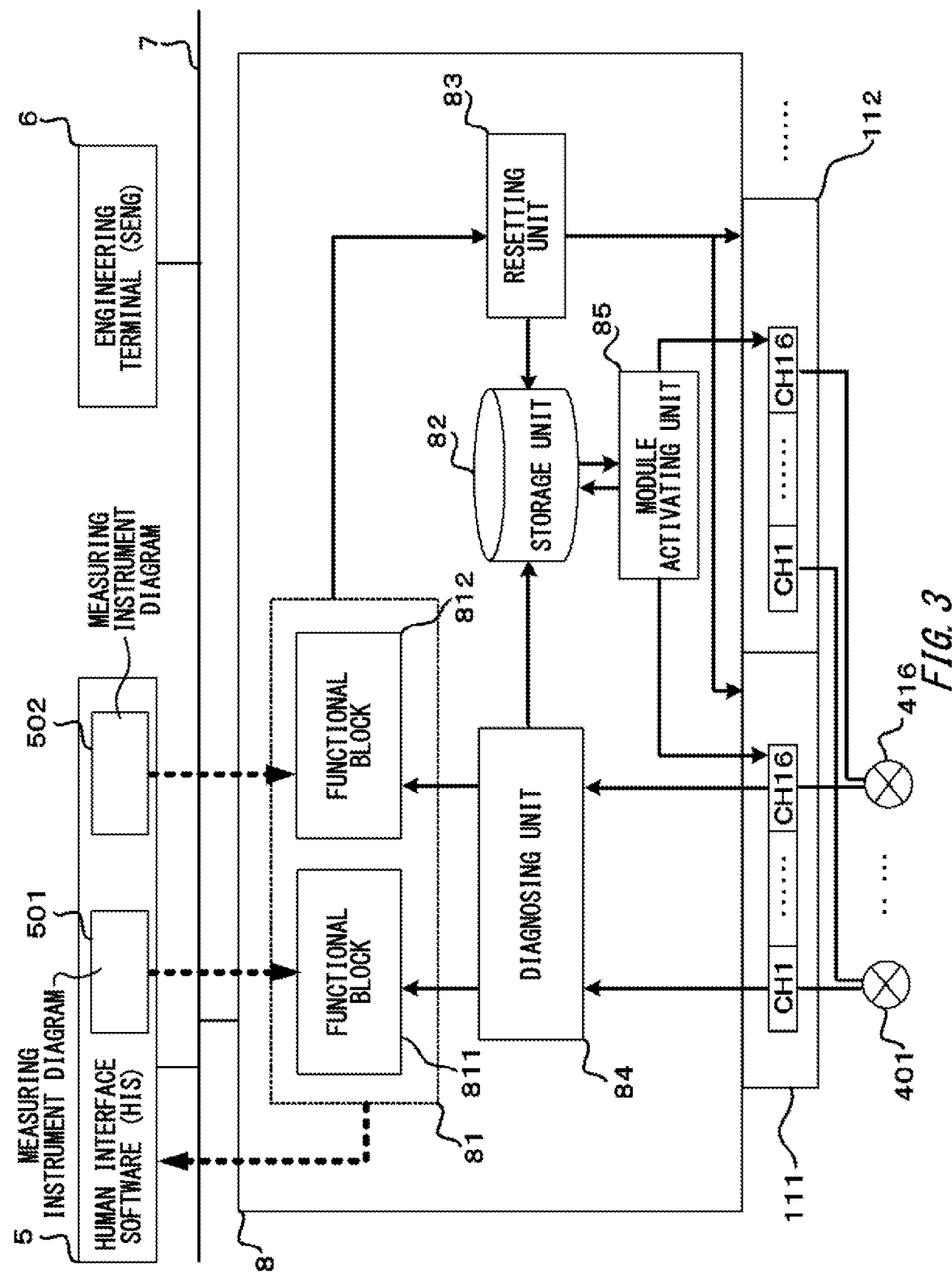
FIG. 3 is a diagram for explaining the configuration showing an example of the present invention.

Configuration Example of Switching Suppression Function about Switching of Controlled State of I/O Modules Next, the switching suppression function 8 about switching between the control state (control side) and standby state (standby side) of I/O modules configured in the processor module 131, which is a constituent element of the control apparatus 100 in the safety instrumented system in FIG. 2, is explained in detail using FIG. 3. FIG. 3 is a diagram for explaining the configuration of the switching suppression function 8 about switching of the controlled state (running/waiting) of I/O modules in one example of the processor module 131 used in the control apparatus 100 of the present invention.

The switching suppression function 8 about switching between the control state (control side) and standby state (standby side) of I/O modules of the present invention is constituted by an application executing unit 81, a storage unit 82, a resetting unit 83, a diagnosing unit 84 and a module activating unit 85.

In addition, in FIG. 3, the I/O modules 111-112 connected with the processor module 131 and field instruments 401-416 connected via the I/O modules 111-112 are also indicated.

The storage unit 82 may be one configured in a memory or external storage medium.

The application executing unit 81 executes programs such as downloaded control programs, and collects data such as measurement values from the field instruments 401-416 via the I/O modules 111-112. The measurement values from the field instruments 401-416 include process values. The application executing unit 81 performs calculation on the collected data, transmits drive signals to other ones among the field instruments 401-416 and controls control-target processes based on a predetermined control program.

Here, the programs such as the downloaded control programs include application logic. The application logic is created by the engineering terminal 6 and is stored on the storage unit 82 as a program. The application logic is described in a functional block diagram (FBD) format or the like using a graphical user interface.

In addition, the storage unit 82 storing the application logic may be a database, memory or external storage medium which is not illustrated and is different from the storage unit 82.

If resetting operation about the field instruments 401-416 is input at the human interface station 5, the functional blocks 811-812 (details of which are described below) receive an instruction about the resetting operation via the control network 7.

In addition, upon reception of an instruction for resetting operation, the functional blocks 811-812 transmit, to the resetting unit 83, a signal for instructing to suspend power supply from the I/O modules 111-112.

One functional block is prepared for each among the field instruments 401-416 in the application executing unit 81.

In addition, the functional blocks 811-812 include a counter (not illustrated) that, after power supply to the field instruments 401-416 is suspended, counts time after which power supply to the field instruments 401-416 should be started again (reset time).

Upon finishing counting the reset time, this counter transmits, to the resetting unit 83, an indication that the reset time has ended and the controlled state should be restored out of the uncontrolled state (details are described below).

The storage unit 82 stores therein: the application logic mentioned above described in the functional blocks 811-812 diagram formats or the like; operation management information mentioned below in which the controlled state which is the control state (control side) or standby state (standby side) of the redundant I/O modules 111-112 is recorded; diagnosis results obtained through diagnoses by the diagnosing unit 84 about whether or not the I/O modules 111-112 connected with the field instruments 401-416 operate normally, for example, without disconnection or without failure; or the like.

In addition, the storage unit 82 may store process values measured by the field instruments 401-416. The storage unit 82 may be a memory or external storage medium.

Based on an instruction, which is received from the functional blocks 811-812, to turn off the power sources at the field instruments 401-416, the resetting unit 83 transmits, to the I/O modules 111-112, an instruction to cause transition of the I/O modules 111-112 from the controlled state to the uncontrolled state in order to suspend power supply to the field instruments 401-416.

Furthermore, if transmitting, to the I/O modules 111-112, an instruction to cause transition of the I/O modules 111-112 from the controlled state to the uncontrolled state in order to suspend power supply from the I/O modules 111-112, the resetting unit 83 confirms the control state (control side) or standby state (standby side) of the pair of the I/O modules 111-112 prior to suspending power supply to the field instruments 401-416, stores the confirmation result in the operation management information and updates it. At this time, about the control state (control side) or standby state (standby side) of the pair of the redundant I/O modules 111-112, the diagnosing unit 84 mentioned below confirms the control state (control side) or standby state (standby side)

set to the I/O modules 111-112 at the time of acquiring a measurement value from the field instruments 401-416, and information indicating that the I/O modules are in the control state (control side) or standby state (standby side) confirmed about each among them is stored in the operation management information and updated.

In addition, if the counter (not illustrated) provided to the functional blocks 811-812 finishes counting the reset time, the resetting unit 83 transmits an indication that the I/O modules 111-112 should be restored to the controlled state out of the uncontrolled state in order to resume power supply from the I/O modules 111-112 to the field instruments 401-416.

Here, one example of the operation management information is shown in FIG. 4. The operation management information includes the controlled state (running/waiting) 41 of the I/O modules 111-112, and the controlled state 42 which is the control state (control side) or standby state (standby side) prior to suspending power supply from the I/O modules 111-112 by the resetting unit 83 based on resetting operation.

The controlled state 42 which is the control state (control side) or standby state (standby side) prior to suspending power supply from the I/O modules 111-112 may include the state at least either at predetermined timing when an instruction to suspend power supply is transmitted to the I/O modules 111-112 or predetermined timing when resetting operation is performed about the field instruments 401-416 by the human interface station 5.

In addition, although in FIG. 4, the control state (control side) and standby state (standby side) of the I/O modules 111-112 are indicated as TRUE and FALSE, it may be indicated as, for example, "Running"/"Waiting", o/x or the like as long as such an indication allows distinction between the running state and waiting state.

If acquiring measurement values from the field instruments 401-416, the diagnosing unit 84 confirms the control state (control side) or standby state (standby side) of the redundant I/O modules 111-112 stored on the memories of the I/O modules 111-112 mentioned below. Then, after confirmation of the control state (control side) or standby state (standby side) at the I/O modules 111-112, the confirmation result is recorded as the controlled state of the I/O modules 111-112 being the control state (control side) or standby state (standby side) in the operation management information stored on the storage unit 82.

The timing at which measurement values are acquired from the field instruments 401-416 and timing at which the control state (control side) or standby state (standby side) of the redundant I/O modules 111-112 is confirmed may be set by a user.

In addition, about whether the I/O modules 111-112 operate without abnormality, for example, whether disconnection or resetting operation has been operated, whether there is not failure/malfunction, and so on, the diagnosing unit 84 performs diagnoses on the I/O modules 111-112 that have undergone transition from the controlled state to the uncontrolled state in order to suspend power supply to the field instruments 401-416 or an I/O module that supplies power to a field instrument not illustrated. At this time, the diagnosing unit 84 stores the diagnosis result about the I/O modules on the storage unit 82.

Here, if the diagnosing unit 84 makes a diagnosis that the I/O modules 111-112 are in the abnormal state for example due to switching between the control state (control side) and standby state (standby side) of the redundant I/O modules, failure such as disconnection, resetting operation being performed and so on, an alarm may be displayed to indicate operation abnormality of the I/O modules 111-112 via the human interface station 5.

It may be recorded as failure/malfunction of the I/O modules 111-112 in the storage unit 82.

Based on a diagnosis result about the controlled state (control state (control side) or standby state (standby side)) before the timing at which the counter provided to the functional blocks 811-812 finishes counting the reset time and the timing at which power supply from the I/O modules 111-112 in the operation management information stored on the storage unit 82 is suspended, whether or not the I/O modules 111-112 have been restored to the controlled state out of the uncontrolled state and so on, the module activating unit 85 instructs the I/O modules 111-112 to resume power supply to the field instruments 401-416 (that is, to turn on the power sources).

In addition, the module activating unit 85 confirms, periodically at preset timing, a diagnosis result that is stored on the storage unit 82, is provided by the diagnosing unit 84 and indicates whether or not the I/O modules 111-112 can operate without abnormality, for example, whether disconnection or resetting operation has been performed, whether there is not failure/malfunction, and so on.

The timing at which the module activating unit 85 periodically confirms diagnosis results provided by the diagnosing unit 84 may be set by a user.

The I/O modules 111-112 each have a plurality of channels, specifically 16 chs (channels), and one of the field instruments 401-416 can be connected to each ch. If the I/O modules 111-112 are configured as redundant modules, the redundant I/O modules 111-112 each are connected at one channel to each among the field instruments 401-416. At this time, the redundant I/O modules 111-112 also have memories (not illustrated) that store the controlled state which is the control state (control side) or standby state (standby side) so that they can themselves determine which among them is in which state, the control state (control side) or the standby state (standby side).

Although in the example used in the present invention, the I/O modules 111-112 are described as modules for analog input, the I/O modules 111-112 may be either modules for analog input/output (AI, AO) or modules for digital input/output (DI, DO).

In addition, the redundant I/O modules 111-112 may be connected with external memories that store the controlled state which is the control state (control side) or standby state (standby side) so that they can themselves determine which among them is in the control state (control side) or the standby state (standby side).

In addition, the I/O modules 111-112 include a counter (timer) (not illustrated) that starts counting upon reception of an instruction from the resetting unit 83 to suspend power supply from the I/O modules. If one module which is in the standby state (standby side) enters the uncontrolled state (the state where the redundant I/O modules 111-112 cannot be controlled by a control apparatus), this counter starts counting, and if it is confirmed that preset time has elapsed, an I/O module 111-112 control means (not illustrated) can suspend power supply to the field instruments 401-416 by causing transition of the other module which is in the control state (control side) from the running state to the uncontrolled state.

Thereby, the one module which is among the redundant I/O modules 111-112 and is in the standby state (standby side) enters the uncontrolled state based on the reset signal, and upon an elapse of preset time, the other module which is in the control state (control side) undergoes transition to the uncontrolled state so that power supply to the field instruments 401-416 can be suspended.

In addition, if the counter provided to the functional blocks 811-812 finishes counting the preset reset time, the controlled state of the I/O modules 111-112 is restored based on the control state (control side) or standby state (standby side) at the redundant I/O modules 111-112 before resetting operation. Then, the I/O modules 111-112 operate as in the control state (control side) or standby state (standby side). Based on the restoration of the I/O modules 111-112 to the controlled state, the I/O modules 111-112 can resume power supply to the field instruments 401-416.

<Operation based on Reset Signal> If an operator controls the redundant I/O modules 111-112 to perform resetting operation about the field instruments 401-416 in order to causes transition of the field instruments 401-416 from the state where an alarm is kept being issued to the normal state (the state where an alarm is not issued), the control apparatus in the safety instrumented system of the present invention makes it possible to operate the I/O modules 111-112 in the control state (control side) or standby state (standby side) as before the resetting even after the resetting, without switching the control state (control side) or standby state (standby side) of the I/O modules 111-112. A method in which an operator performs resetting operation and resetting is performed about the field instruments 401-416 is specifically explained with reference to FIG. 5 to FIG. 6.

Figure 5:
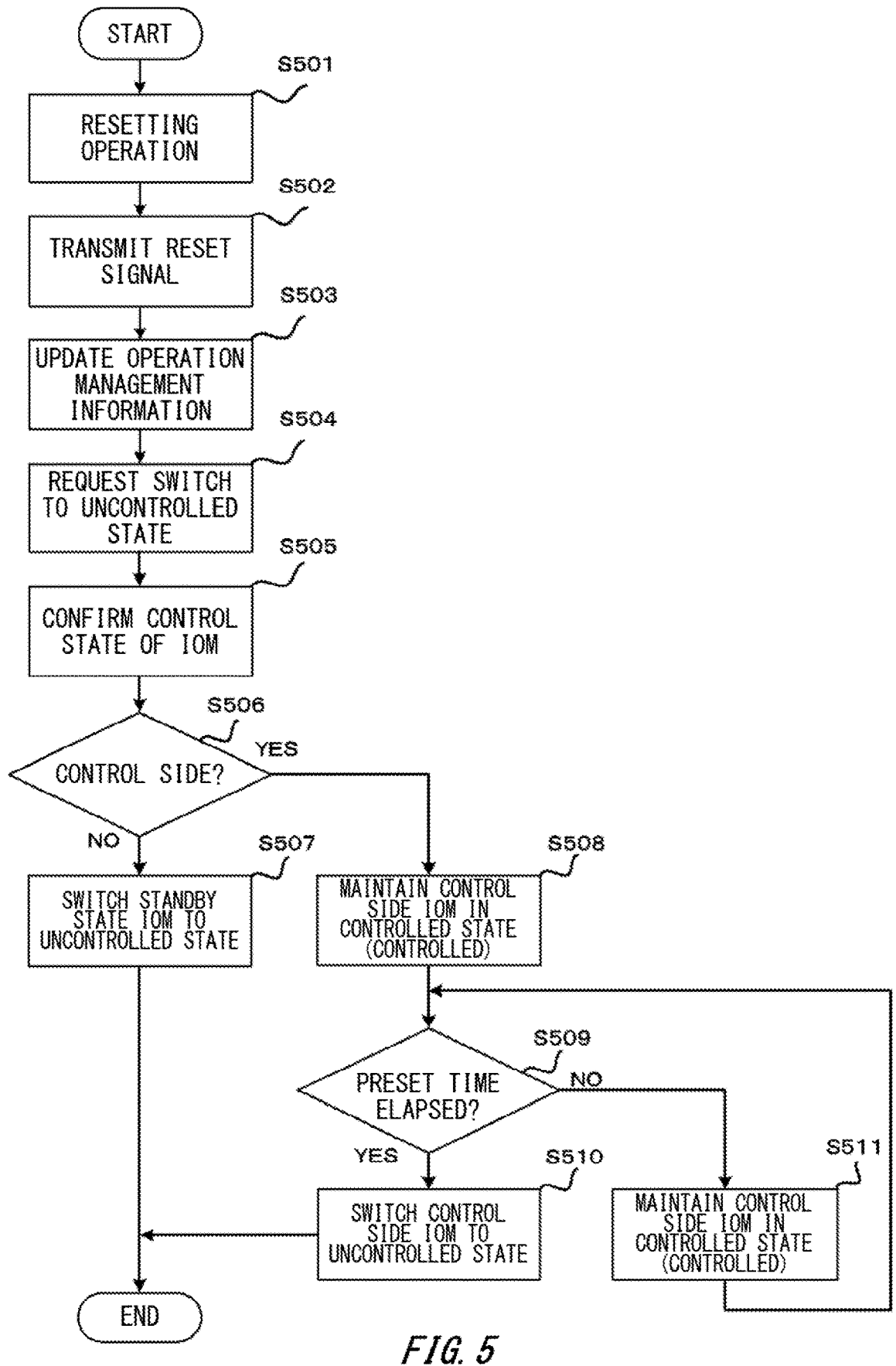
FIG. 5 is a flowchart showing one example of operation of suspending power supply from I/O modules of the present invention.

(Operation of Suspending Power Supply from I/O Modules) FIG. 5 shows a flowchart according to one example of the control apparatus in the safety instrumented system of the present invention in which an operator controls the I/O modules 111-112 to perform resetting operation about the field instruments 401-416, an instruction to suspend power supply to the field instruments 401-416 by controlling the I/O modules 111-112 is input, and the I/O modules 111-112 undergo transition from the controlled state to the uncontrolled state in order to suspend power supply from the I/O modules 111-112.

First, at Step S501, an operator confirms an alarm displayed according to a signal of the field instruments 401-416 installed at the plant via the human interface station 5, and after safety of the plant is confirmed, presses reset buttons 501/502 on the measuring instrument diagrams 501/502 that are displayed on the human interface station 5 and are for performing resetting corresponding to the field instruments 401-416 (Step S501). If the reset buttons are pressed, a signal instructing to perform resetting operation about the field instruments 401-416 is transmitted via the control network to the functional blocks 811-812 that operate in the application executing unit 81.

At Step S501, the human interface station 5 may record, in the operation management information stored on the storage unit 82, the controlled state of the I/O modules 111-112 which is the control state (control side) or standby state (standby side) at the timing when the reset buttons of the field instruments 401-416 are pressed.

Next, at Step S502, upon reception, from the human interface station 5, of a signal instructing to perform resetting operation about the field instruments 401-416, the functional blocks 811-812 transmit, to the resetting unit 83, a signal instructing to suspend power supply to the field instruments 401-416 to be reset from the I/O modules 111-112 to which the field instruments 401-416 are connected (Step S502).

At Step S503, the resetting unit 83 confirms the control state (control side) or standby state (standby side) of the I/O modules 111-112 recorded in the operation management information stored on the storage unit 82, and updates the control state (control side) or standby state (standby side) of the I/O modules 111-112 before resetting at the field instruments 401-416 in the operation management information as the controlled state which is the control state (control side) or standby state (standby side) prior to suspending power supply from the I/O modules 111-112 (Step S503).

In addition, if the controlled state of the I/O modules 111-112 which is the control state (control side) or standby state (standby side) before resetting at the field instruments 401-416 in the operation management information is updated at Step S503, the controlled state which is the control state (control side) or standby state (standby side) prior to suspending power supply from the I/O modules 111-112 may be at least either one of the state at predetermined timing when an instruction to suspend power supply is transmitted to the I/O modules 111-112 and the state at predetermined timing when resetting operation is performed about the field instruments 401-416 by the human interface station 5.

At Step S503, the controlled state of the I/O modules 111-112 which is the control state (control side) or standby state (standby side) recorded in the operation management information is based on a diagnosis result about the controlled state, which is the control state (control side) or standby state (standby side), of the redundant I/O modules 111-112 that are connected to the diagnosing unit 84 which makes diagnoses about them periodically.

At Step S504, the resetting unit 83 transmits, to the I/O modules 111-112, an instruction to cause transition of the I/O modules 111-112 from the controlled state to the uncontrolled state in order to suspend power supply to the field instruments 401-416 (Step S504).

Next, at Step S505, upon reception of the instruction to cause transition of the I/O modules 111-112 from the controlled state to the uncontrolled state in order to suspend power supply to the field instruments 401-416, each among the redundant I/O modules 111-112 confirms its own control state (control side) or standby state (standby side) (Step S505). At this time, each among the I/O modules 111-112 confirms which one among the redundant modules is in the control state (control side) or standby state (standby side) from information about the controlled state which is the control state (control side) or standby state (standby side) recorded in the memory provided to each among the I/O modules 111-112.

Furthermore, at Step S506, based on the control state (control side) or standby state (standby side) of each among the I/O modules 111-112 confirmed at Step S505, each among the I/O modules 111-112 having received an instruction to bring the I/O modules 111-112 into the uncontrolled state determines whether each among the redundant modules is on the running side or waiting side, that is, determines whether they are in the running state or waiting state (Step S506).

At Step S507, if it is determined at Step S506 that one of the I/O modules is on the waiting side, an I/O module control means (not illustrated) causes transition of the I/O module on the waiting side to the uncontrolled state based on an instruction from the resetting unit 83 to cause transition of the I/O modules 111-112 from the controlled state to the uncontrolled state (Step S507).

The reason why the I/O module on the waiting side is caused to shift to the uncontrolled state at Step S507 is because if transition to the uncontrolled state is caused in order to suspend power supply from the I/O module on the running side, as explained in the background art section, the state of the I/O modules 111-112 switch to the running side or waiting side and due to switching of the running side or waiting side, information indicating that failure occurred to the I/O modules 111-112 is stored.

Here, the uncontrolled state refers to the state where the redundant I/O modules 111-112 cannot be controlled by a control apparatus (off-line state), for example, the state where power supply to the field instruments 401-416 cannot be controlled.

At Step S508, if it is determined at Step S506 that one of the I/O modules is on the running side, a control means (not illustrated) for this I/O module maintains power supply from the I/O module on the running side even if it receives an instruction from the resetting unit 83 to bring the I/O modules 111-112 into the uncontrolled state in order to suspend power supply therefrom (Step S508).

In addition, if power supply of the I/O module on the running side is maintained at Step S508, a counter provided to this I/O module 111 or 112 is activated and starts counting.

At Step S509, the I/O module 111-112 control means (not illustrated) compares time counted by the counter of the I/O modules 111-112 with preset time during which power supply of a module on the running side should be maintained (Step S509).

At this time, the preset time during which power supply on the running side should be maintained may be set by a user. In addition, the preset time during which power supply on the running side should be maintained may be stored on the memories provided to the I/O modules 111-112.

At Step S510, if it is determined at Step S509 that the time indicated by the counter has exceeded the preset time, the I/O module 111-112 control means (not illustrated) causes transition of the module on the running side from the controlled state to the uncontrolled state in order to suspend power supply from the module on the running side (Step S510).

At this time, if the redundant I/O modules 111-112 receive an instruction to cause transition from the controlled state to the uncontrolled state in order to suspend power supply to the field instruments 401-416, a module on the waiting side first enters the uncontrolled state, and upon an elapse of predetermined time, a module on the running side enters the uncontrolled state. That is, if power supply to the field instruments 401-416 is to be suspended, both the redundant I/O modules 111-112 enter the uncontrolled state.

In addition, by the resetting unit 83 transmitting, to the I/O modules 111-112, an instruction to suspend power supply at Step S510, the counter provided to the functional blocks 811-812 starts counting preset time during which power supply should be suspended.

The time during power supply to the field instruments 401-416 should suspended may be previously set by a user.

At Step S511, if it is determine at Step S509 that time indicated by the counter has not exceeded the preset time, the I/O module 111-112 control means (not illustrated) keeps the I/O module on the running side on the running side in order to maintain power supply from it (Step S511).

With such operation, if the I/O modules 111-112 are controlled via the human interface station 5 to perform resetting operation about a field instrument, the controlled state which is the control state (control side) or standby state (standby side) prior to suspending power supply from the I/O modules 111-112 is stored in the operation management information and updated based on the controlled state which is the control state (control side) or standby state (standby side) at at least either one of predetermined timing when an instruction to suspend power supply is transmitted to the I/O modules 111-112 and predetermined timing when resetting operation is performed about the field instruments 401-416 at the human interface station 5. Therefore, the control apparatus 100 can store the controlled state which is the control state (control side) or standby state (standby side) at the I/O modules 111-112 before resetting operation is performed about the field instruments 401-416.

In addition, the I/O modules 111-112 can suspend power supply to the field instruments 401-416 without switching of the I/O modules 111-112 to the control state (control side) or standby state (standby side).

If an operator performs resetting operation about any one of the respective field instruments 401-416 connected to the respective channels of the I/O modules 111-112, all the field instruments (not illustrated) connected to the respective channels of the I/O modules 111-112 may be reset.

Operation of Resuming Power Supply from I/O Modules)

Figure 6:
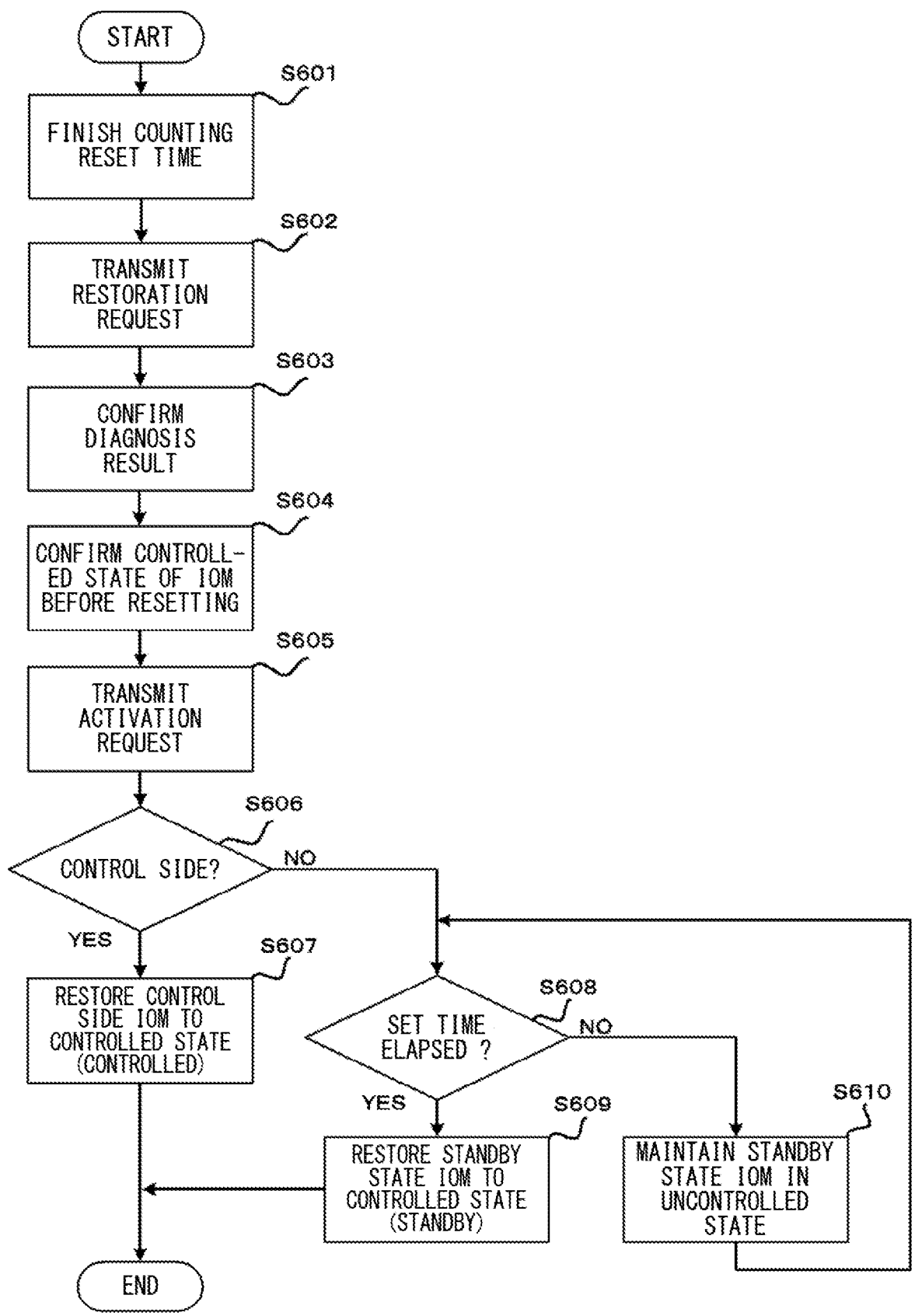
FIG. 6 is a flowchart showing one example of operation of resuming power supply from the I/O modules of the present invention.

FIG. 6 is a flowchart in which an instruction to cause transition of the I/O modules 111-112 from the controlled state to the uncontrolled state is input in order to suspend power supply to the field instruments 401-416 shown in FIG. 5, and after power supply to the field instruments 401-416 is suspended, power supply is resumed after an elapse of predetermined time.

First, at Step S601, the functional blocks 811-812 confirm with the counter provided to the I/O modules 111-112 whether a predetermined period of time has elapsed after power supply from the I/O modules 111-112 has entered the suspended state. If it is confirmed that a predetermined period of time has elapsed, a signal indicating that the predetermined time has elapsed after power supply from the I/O modules 111-112 is suspended is transmitted to the resetting unit 83, and the process proceeds to Step S602 (Step S601).

At Step S602, the resetting unit 83 transmits, to the I/O modules 111-112, an instruction to cause restoration to the controlled state out of the uncontrolled state in order to resume power supply to the field instruments 401-416 (Step S602). At this time, if the diagnosing unit 84 makes a diagnosis about the I/O modules 111-112 that the I/O modules 111-112 have been restored or cannot be restored to the running state or waiting state (controlled state) out of the uncontrolled state, it stores, as a diagnosis result and in the storage unit 82, information indicating that they have been restored or cannot be restored to the running state or waiting state (controlled state).

At Step S603, the module activating unit 85 periodically confirms a diagnosis result which is stored on the storage unit 82 and is provided about the I/O modules 111-112 by the diagnosing unit 84, for example, a diagnosis result about whether resetting operation has been performed and they are not in the uncontrolled state or whether or not there is abnormality, for example, whether there is not failure/malfunction and so on (Step S603).

At Step S604, the module activating unit 85 confirms, from the operation management information stored on the storage unit 82, the controlled state which is the control state (control side) or standby state (standby side) prior to suspending power supply from the I/O modules 111-112 (Step S604).

Next, at Step S605, the module activating unit 85 transmits a signal instructing to cause restoration of the I/O modules 111-112 to the controlled state out of the uncontrolled state in order to resume power supply to the field instruments 401-416 based on a diagnosis result which is confirmed at Step S603 and Step S604, is stored on the storage unit 82 and is provided about the I/O modules 111-112 by the diagnosing unit 84, for example, diagnosis results obtained through periodical diagnoses about whether resetting operation has been performed and they are not in the uncontrolled state or whether or not there is abnormality about the I/O modules 111-112, for example, whether there is failure/malfunction and so on, and the controlled state which is the control state (control side) or standby state (standby side) prior to suspending power supply from the I/O modules 111-112 in the operation management information (Step S605).

In addition, at Step S605, the module activating unit 85 transmits a signal instructing to cause restoration of the I/O modules 111-112 to the controlled state out of the uncontrolled state in order to resume power supply to the field instruments 401-416 based on a diagnosis result indicating a determination about normality, for example, indicating that at Step S602, the resetting unit 83 transmitted, to the I/O modules 111-112, an instruction to cause restoration to the controlled state out of the uncontrolled state and they are restored and so on.

Furthermore, at Step S606, based on a signal from the module activating unit 85 instructing to cause restoration to the controlled state out of the uncontrolled state in order to resume power supply from the I/O modules 111-112, the I/O module 111-112 control means (not illustrated) determines which among the respective redundant modules is a module on the running side or a module on the waiting side based on the operation management information stored on the storage unit 82 (Step S606). The I/O modules 111-112 may have storage units (not illustrated) that store the operation management information.

At Step S607, if it is determined at Step S606 that an I/O module was on the running side, the I/O module 111-112 control means (not illustrated) restores one module to the controlled state out of the uncontrolled state and causes it to operate as the running side in order to resume power supply from the I/O module which was on the running side before resetting (Step S607).

At Step S608, if it is determined at Step S606 that an I/O module was on the waiting side, the I/O module 111-112 control means (not illustrated) keeps, in the uncontrolled state, the I/O module which was on the waiting side, and the counter provided to the I/O modules 111-112 is activated.

At Step S608, the I/O module 111-112 control means (not illustrated) compares time counted by the counter provided to the I/O modules 111-112 with preset time during which the I/O module which was on the waiting side before resetting should be kept in the uncontrolled state (Step S608).

The preset time during which the I/O module which was on the waiting side before resetting should be kept in the uncontrolled state is stored on the memories provided to the I/O modules 111-112 (not illustrated).

In addition, the preset time during which the I/O module which was on the waiting side before resetting should be kept in the uncontrolled state may be set by a user.

At Step S609, if it is determined at Step S608 that the time counted by the counter finished counting the preset time, as the I/O module on the waiting side, it is restored to the controlled state out of the uncontrolled state (Step S609).

At Step S610, if it is determined at Step S608 that the time indicated by the counter provided to the I/O modules 111-112 has not finished counting the preset time, the I/O module which was on the waiting side before resetting is kept in the uncontrolled state (Step S610).

With such operation, the human interface station 5 performs resetting operation about the field instruments 401-416 so that even if power supply to the field instruments 401-416 is suspended, the I/O modules 111-112 maintain the controlled state which is the control state (control side) or standby state (standby side) as before resetting operation, and can resume power supply to the field instruments 401-416.

Furthermore, by restoring one module which was on the waiting side before resetting to the controlled state out of the uncontrolled state as the module on the waiting side after an elapse of preset time, the I/O modules 111-112 themselves can determine which among the redundant I/O modules 111-112 is on the running side or waiting side, that is, can determine whether they are on the running state or waiting state.

Although it is described in the present example that power supply to the field instruments 401-416 is performed by one module in the control state (control side) among the redundant I/O modules 111-112, both the modules on the control state (control side) or standby state (standby side) may supply power to the field instruments 401-416.

In this manner, the control apparatus according to the present embodiment includes a storage unit that stores operation management information; an application executing unit that transmits a signal for suspending power supply to the field instrument; and a resetting unit that, based on the signal, transmits an instruction to suspend power supply from the input/output module.

With such a configuration, the control apparatus in the safety instrumented system of the present invention can maintain the I/O modules 111-112 in the control state (control side) or standby state (standby side) as before resetting operation, even if the resetting operation is performed about the field instrument 4 by the human interface station 5. Therefore, unnecessary notice about failure of the I/O modules 111-112 can be reduced so that an operator, maintenance worker or the like at the plant can promptly cope with failure of the I/O modules 111-112.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a control apparatus that: communicates with a field instrument installed in a plant via a plurality of input/output modules; and causes one of two of the plurality of input/output modules to run and the other one to wait, to make the input/output modules redundant, the control apparatus including: a storage unit that stores operation management information; an application executing unit that transmits a signal for suspending power supply to the field instrument; and a resetting unit that, based on the signal, transmits an instruction to suspend power supply from the input/output modules, wherein based on reception of the signal, the resetting unit stores or updates the controlled state of the input/output modules stored in the operation management information, so that the control apparatus can grasp that the input/output modules prior to suspending power supply from the input/output modules are in the control state (control side) or standby state (standby side), thereby enabling suppression of switching of the redundant input/output modules between the control state (control side) and standby state (standby side).

REFERENCE SIGNS LIST 1, 100: control apparatus; 4, 401-416: field instrument; 5: human interface station; 6: engineering terminal; 7: control network; 8: running state switching suppression function; 81: application executing unit; 82: storage unit; 83: resetting unit; 84: diagnosing unit; 85: module activating unit

What is claimed is:

1. A control apparatus comprising:
a storage unit that stores operation management information;
an application executing unit that communicates with a field instrument installed in a plant via a plurality of input/output modules that are configured such that one of two of the plurality of input/output modules runs while the other one waits to make the input/output modules redundant, and transmits a signal for suspending power supply to the field instrument; and
a resetting unit that, based on the signal, transmits an instruction to suspend power supply from the input/output modules, wherein
based on reception of the signal, the resetting unit stores or updates a controlled state of the input/output modules stored in the operation management information at least either: at timing of transmission of the instruction to suspend the power supply, or at timing when operation for suspending the power supply to the field instrument is performed by a human interface station connected with the control apparatus via a network, the controlled state indicating whether the input/output modules are running or waiting.

2. The control apparatus according to claim 1, wherein the operation management information further includes a state whether the redundant input/output modules are running or waiting.

3. The control apparatus according to claim 1, wherein upon reception of the instruction to suspend the power supply, the redundant input/output modules suspend power supply from a running input/output module among the input/output modules after an elapse of preset time.

4. The control apparatus according to claim 1, wherein
the application executing unit transmits a signal for resuming the power supply to the field instrument;
the resetting unit, based on the signal for resuming the power supply, transmits an instruction to resume the power supply from the input/output modules; and
the control apparatus further comprising
an activating unit that transmits an instruction to resume the power supply from the input/output modules, based on an elapse of preset time during which the power supply from the input/output modules should be suspended.

5. The control apparatus according to claim 4, wherein upon reception, from the activating unit, of the instruction to resume the power supply from the input/output modules, based on the operation management information, the redundant input/output modules resume the power supply from an input/output module which has been running among the input/output modules.

6. The control apparatus according to claim 1, wherein
the input/output modules have a control means that switches a state of the input/output modules between a running state and a waiting state, and
based on the state of the input/output modules being switched between the running state and the waiting state by the control means, in the operation management information, information that is stored on a memory provided to the input/output modules and indicates that the input/output modules are in the running state or the waiting state is stored or updated.

7. The control apparatus according to claim 1, wherein the field instruments issues an alarm if a measurement value exceeding a predetermined threshold is detected, the alarm to be canceled by suspending a power supply to the field instrument.

8. A control method performed by a control apparatus which: is in a plant where a field instrument is installed; and has a storage unit that communicates with the field instrument via a plurality of input/output modules and stores operation management information, the control method for causing one of two of the plurality of input/output modules to run and the other one to wait, to make the input/output modules redundant, the method comprising:
transmitting a signal for suspending power supply to the field instrument;
transmitting, based on the signal, an instruction to suspend power supply from the input/output modules;
storing or updating, based on reception of the signal, a controlled state of the input/output modules at least either: at timing of transmission of the instruction to suspend the power supply, or at timing when operation for suspending the power supply to the field instrument is performed by a human interface station connected with the control apparatus via a network, the controlled state indicating whether the input/output modules are running or waiting;
transmitting, based on an elapse of preset time during which the power supply from the input/output modules should be suspended, an instruction to resume the power supply from the input/output modules; and
storing or updating, based on reception of the instruction to resume, the controlled state of the input/output modules stored in the operation management information.

9. A non-transitory computer readable medium storing thereon a program that, when executed by a computer, causes the computer to function as a control apparatus which: is in a plant where a field instrument is installed; and has a storage unit that communicates with the field instrument via a plurality of input/output modules and stores operation management information, the control method for causing one of two of the plurality of input/output modules to run and the other one to wait, to make the input/output modules redundant by performing operations comprising:
transmitting a signal for suspending power supply to the field instrument;
transmitting, based on the signal, an instruction to suspend power supply from the input/output modules;
storing or updating, based on reception of the signal, a controlled state of the input/output modules at least either: at timing of transmission of the instruction to suspend the power supply, or at timing when operation for suspending the power supply to the field instrument is performed by a human interface station connected with the control apparatus via a network, the controlled state indicating whether the input/output modules are running or waiting;

transmitting, based on an elapse of preset time during which the power supply from the input/output modules should be suspended, an instruction to resume the power supply from the input/output modules; and storing or updating, based on reception of the instruction to resume, the controlled state of the input/output modules stored in the operation management information.

\* \* \* \* \*